ROOF COLLAR CONSTRUCTION
Original Filed April 23, 1962 3 Sheets-Sheet 1
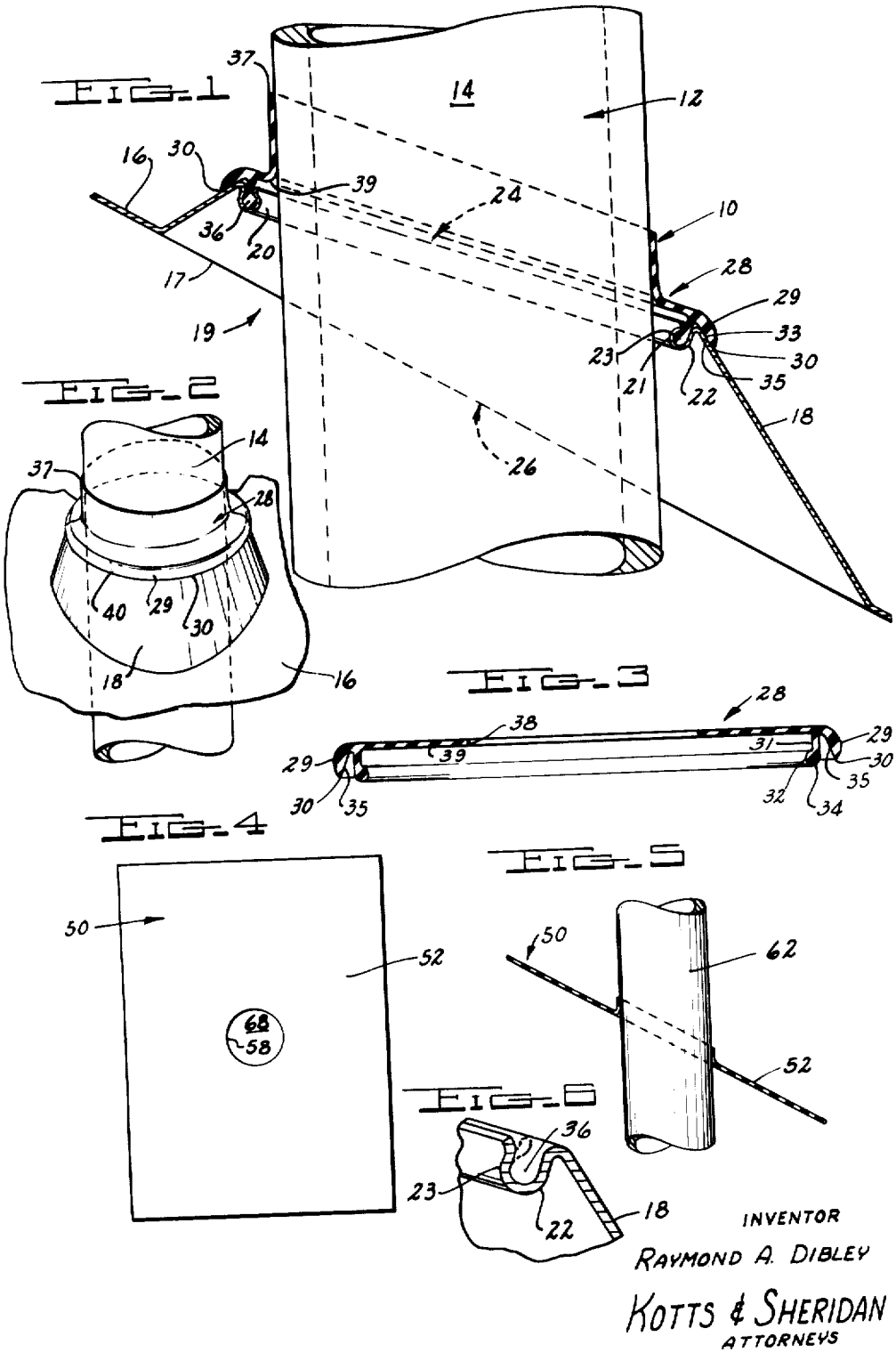
INVENTOR
RAYMOND A. DIBLEY
KOTTS & SHERIDAN
ATTORNEYS

ROOF COLLAR CONSTRUCTION

Original Filed April 23, 1962 3 Sheets-Sheet 2

INVENTOR.
RAYMOND A. DIBLEY

BY

ROOF COLLAR CONSTRUCTION

Original Filed April 23, 1962 3 Sheets-Sheet 3

INVENTOR.
RAYMOND A. DIBLEY
BY

United States Patent Office

Re. 26,026
Reissued May 17, 1966

26,026
ROOF COLLAR CONSTRUCTION

Raymond A. Dibley, 13435 Loretto, Detroit, Mich.

Original No. 3,098,663, dated July 23, 1963, Ser. No. 192,023, Apr. 23, 1962. Application for reissue Jan. 13, 1965, Ser. No. 440,971
14 Claims. (Cl. 285—43)

Matter enclosed in heavy brackets [ ] appears in the original patent but forms no part of this reissue specification; matter printed in italics indicates the additions made by reissue.

The present invention relates to new and useful improvements in roof collars and more particularly to a universal, resilient roof collar construction which is adapted to form a watershed on any vent pipe, flue or like cylindrical projection that extends through a roof, irrespective of the roof pitch.

The instant application is a continuation in part of my roof collar application, Serial No. 744,457, filed June 25, 1958, now abandoned, and Serial No. 540,459, filed October 14, 1955, now abandoned.

During the construction of new residential and commercial buildings and prior to the time the roofing is laid, the rough plumbing is installed. Various vent pipes, flues, etc., which comprise a portion of the rough plumbing are so positioned as to extend through openings cut in the roof. In the prior art, flanged roof collar assemblies were dropped over the end of each respective vent pipe, so as to cover the opening in the roof. The base flanges of each of the collars were supported by the roof structure proper.

The collars ordinarily used, comprised an annular lead sleeve of larger diameter than that of the vent pipe. Although the roof collar was positioned on the roof, the caulking of the joint was always delayed until after the roofing was completed. The reason for the delay was that the base flange of the roof collar assembly had to be interleaved with shingles. To complete this operation, the roof collar had to be free to move. Should the joint between the vent stack and the lead sleeve have been completed, it would be broken as a result of movement during the roofing operation.

It has been conventional practice for the plumber to place the roof collar in position and then return to the building site after the roofing has been completed, to caulk the roof collar joints. This, of course is an extremely costly proposition, since it necessitates the plumbers returning to the building, for a job which probably takes less time to complete, than the time required to travel to the site. In frequent instances, the plumber forgets to make the second trip. Consequently, the building resident notices dampness in the plaster, as well as blistered paint. When this occurs, the resident is usually quite disturbed and he calls the builder, to state in no uncertain terms that his roof is leaking and that it requires immediate attention.

The builder then calls the roofer, who must stop the job on which he is working and return to the previous building site. After a complete examination of the roof, the roofer finds that the roof collar has not been properly caulked. This infuriates the roofer, because of his loss of his time, due to a complaint for which he was not responsible. The builder having been notified of the situation, then calls the plumber.

The plumber then goes to the site, repairs or caulks the vent pipe seal (lead) and returns to his former job. Each person involved loses a considerable amount of time and money, and more often than not is very disturbed over the whole situation. This is not only a costly and time consuming operation, but a nuisance which antagonizes all persons involved.

It must also be noted, with this type construction, the roof collar joint when caulked, becomes a rigid part of the building structure, and any movement of the roof due to settlement of the building, wind, rain or snow load, etc., with respect to the vent pipe causes a breaking or cracking of the caulked seal which results in a leak.

Vibration caused by heavy vehicles on nearby highways, is also a contributing factor to roof collar failure, since it is this vibration that causes a settling of the building, which in turn causes a movement of the roof with respect to the vent pipe, thus cracking the seal.

From the foregoing, it is apparent that roof collars which require a rigid connection between the vent pipe and roof collar, will not form a permanent seal, whereas a resilient roof collar which is free to float, will maintain a watertight seal, even though the roof shifts or otherwise sags.

It is therefore a principal object of the present invention to provide an improved roof collar construction which is simple and durable and capable of being produced in large quantities by modern mass production methods, at a cost which is equal to, or less than the cost of existing devices.

Another object of this invention is the provision of a resilient roof collar construction, which can be readily installed in a single service operation, without any danger or possibility of breaking the watertight joint as a result of movement during the roofing operation.

Another object is the provision of a resilient roof collar construction which will withstand exposure to the sun's rays, ozone, etc., and resistant to damage from snow, hail, wind, sand and rain.

Still another object of the present invention is the provision of a resilient roof collar construction which is readily adjusted to conform to any roof pitch, as well as a wide range of vent stack sizes, while remaining flexible and operational in extreme weather conditions, both hot and cold.

Another object of the invention is the provision of a resilient roof collar construction, which when applied forms a watertight seal under all conditions, irrespective of the roof movement caused by the wind, rain and snow.

Another object of the present invention is the provision of a resilient roof collar which will not be rendered ineffective so as to leak as a result of vibration caused by heavy vehicles or settling of the building on which the roof collar is mounted.

Still another object of the invention is the provision of a resilient roof collar construction which is installed by non-skilled help, and which will provide a watershed on a vent pipe, flue, etc., without necessity of constant maintenance, repair or replacement for a long period of time, while retaining substantially the original and initial elastic qualities.

Another object of the invention is the provision of a durable and resilient roof collar which can be installed by non-skilled labor in less than 60 seconds, that will provide a joint which will not be damaged by settling of the building, wind, rain, snow or vibration, as opposed to the time consuming, inefficient, hammered lead joint sealing method which has been used in the past.

The foregoing and related objects can be accomplished by the provision of a resilient roof collar construction for use with a cylindrical vent pipe, wherein a substantially flat, rectangular body portion has an embossure struck therefrom; an annular opening located in said embossure, with a clamping pocket formed on the inside diameter of said embossure opening, said clamping pocket terminating in an upwardly formed generally S-shaped lip depressed below the upper plane surface of said embossure; the plane surface thereof terminating in angular relationship to the plane of said flat flange member; an annular [, generally flat] disc of thin resilient material; said disc member having an enlarged portion on the periphery thereof; a downwardly depending flange portion intermediate the peripheral edge portion and integral therewith; an enlarged bulb section on the end of said downwardly depending flange; said bulb portion secured within said S-shaped pocket; a round opening centrally located in said resilient disc; said resilient disc displaced over a cylindrical vent pipe of greater diameter than said opening to form a watertight joint therebetween.

Other objects of this invention will appear in the following description and appended claims, reference being had to the accompanying drawings, forming a part of this specification, wherein like reference characters designate corresponding parts in the several views.

In the drawings:

FIGURE 1 represents a cross-sectional view of a roof collar construction embodying the present invention, installed on a vent pipe.

FIGURE 2 is a reduced size elevational view of the roof collar assembly shown in FIGURE 1.

FIGURE 3 is a cross-sectional view through the roof collar resilient disc illustrated in FIGURE 1 in the unmounted condition.

FIGURE 4 is a plan view of a modified form of the present invention.

FIGURE 5 is a cross-sectional view through the modified form of the invention shown in FIGURE 4 mounted on a vent pipe.

FIGURE 6 is a fragmentary enlarged section of the bulb pocket of the flange body before assembly.

Figure 12:
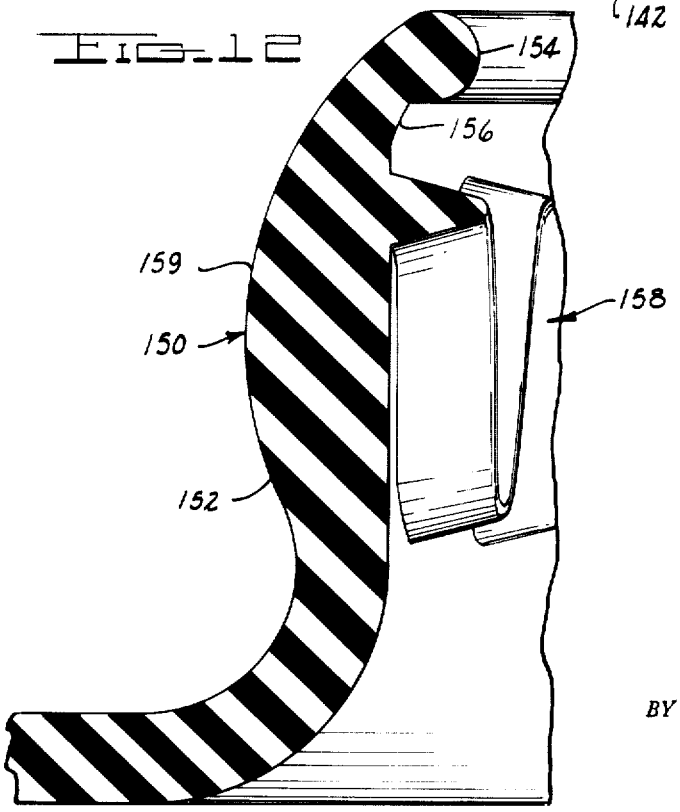

FIGURE 12 discloses another modified form of the central opening in the resilient disc, wherein the central portion thereof is in the form of a sleeve, with a serpentine shape on the inner diameter thereof.

Before explaining the present invention in detail, it is to be understood that the invention is not limited in its application to the details of construction and arrangement of parts illustrated in the accompanying drawings, since the invention is capable of many other embodiments and of being practiced or carried out in various ways. Also it is to be understood that the phraseology or terminology employed herein is for the purpose of description and not limitation.

Referring to the drawings, FIGURE 1 represents a complete roof collar assembly 10, positioned on a cylindrical vent pipe extension 12. The vent pipe 12 is made from cast iron or other suitable material which is usually coated with bituminous material 14, so as to prevent rust and corrosion on the outer surface thereof.

The roof collar assembly 10 comprises a generally flat rectangular body portion 16, which has a conical embossure 18 struck from the central area 19 thereof. It will be noted that the rectangular body portion 16 shown in FIGURES 1 and 2 is broken away to conserve space, however the shape of the body is rectangular in configuration.

A generally round opening 20 is located in the conical embossure 18. The edges thereof, or inside diameter 21 of opening 20 has formed thereon, a downwardly depending flange portion 22, which terminates in a generally S-shaped lip 23 in the form of a pocket. The deformed portion 36 opens upwardly and is located generally below the upper plane surface 24 of the conical embossure 18. The upper plane surface 24 of the conical embossure 18 is positioned in angular relationship to the plane surface 26 of the rectangular body portion 16. The S-shaped lip 23 protects the inner surface of a downwardly depending flange 31 from damage or tearing during assembly of the flange, as well as holding the disc 28 in a pre-determined position.

The annular disc 28 is made from a resilient material such as rubber, neoprene, hypalon or other synthetic plastic material. The resilient disc member 28 [is generally flat and] has a thickened peripheral portion 29. The thickened peripherial portion 29 is generally semicircular in shape and terminates in a feathered edge lip 30, the underside 35 of which engages the outside surface 33 of the conical embossure 18.

A downwardly depending flange portion 31 extends at generally right angles to the undersurface 39 of the resilient disc 28 and immediately adjacent to the feathered edge portion 30. The lower section 32 of the flange 31 has an enlarged bulb section 34 thereon, which is adapted to be held in the pocket 36 located in opening 20.

The resilient disc 28 has a central opening 38 therein which is of less diameter than the vent pipe 12. The resilient disc 28 of course is resiliently yieldable to slide over the outside diameter of the vent pipe and firmly engage same.

After the bulb section 34 is crimped into the pocket 36 and the complete assembly 10 is formed, the resilient disc portion 28 thereof is positioned over the vent stack 12. The underside 39 thereof engages the outside of the vent pipe to form a long thin watertight joint 37. The plane surface of engagement of the disc 28 with respect to the vent pipe is angular as is the disc's relation to the roof proper. The flat body portion 16 of the roof collar is in engagement with the roof (not shown) and interleaved with shingles, thereby forming a watertight connection therewith. Application of the roof collar assembly 10 over the vent pipe 12 prior to the application of shingles will not cause a leak in the joint formed thereby, as would be the case if the lead joint were completed when the roof collar was initially installed.

The reduced size drawing illustrated in FIGURE 2 shows the long thin joint 37 between the vent stack 12 and the resilient disc 28. The enlarged edge portion 29 is shown in engagement with the outside diameter of the conical embossure 18, which forms a watertight joint 40 therebetween.

FIGURE 3 of the drawings illustrates a cross-sectional view through an unmounted resilient disc 28. As previously stated, the resilient disc 28 has an enlarged peripherial portion 29 which terminates in a feathered edge 30. Integral therewith and extending downwardly at substantially right angles to the underside 39 of the disc 28 is a bulb 34 on the end of a flange 31. The bulb member 34 goes around the inner circumference of the flange 31 and is received in the pocket 36 of the conical embossure 18. When the bulb 34 is locked into the pocket 36, the assembly 10 is ready for installation.

When the roof collar 10 is installed, it is first positioned over the end of a vent pipe. The opening 38 in the central portion thereof is caused to be stretched over the pipe and down the pipe until the flange body 16 engages the roof proper. A watertight joint has now been formed therebetween, irrespective of the roof pitch. The joint formed thereby, in this instance is generally elliptical in shape.

FIGURE 4 of the drawings shows a simple modified form of the present invention, wherein the complete structure is made from a thin sheet of resilient material 52. The complete assembly 50 is of rectangular shape and has a round opening 58 therein which is of less diameter than the outside diameter of the vent pipe 62 on which the collar is adapted to be positioned. The modified roof collar 50 is installed in the same manner as the first device, however, only a minimum amount of tooling is required to produce the simplified model.

FIGURE 6 of the drawings shows an enlarged cross-sectional view of the pocket 36, formed in the opening 20 of the conical embossure 18, before final forming. It will be appreciated that the S-shaped lip 23 provides a protective surface for engagement with the bulb 34 and eliminates any possibility of damage to the flange 31, when secured to the body 16.

Figure 7:
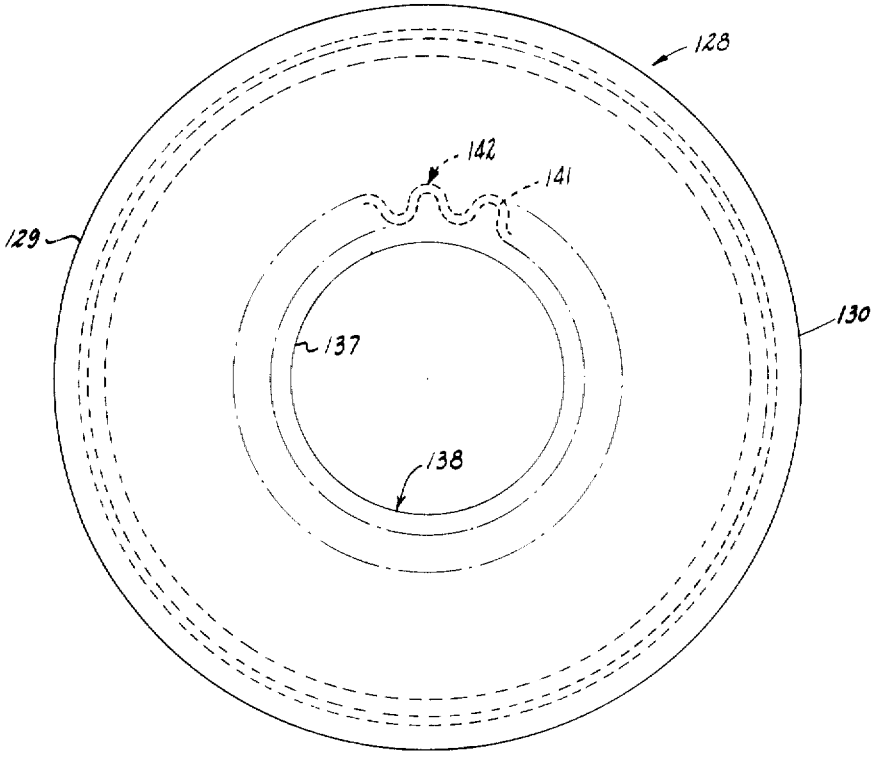
FIGURE 7 is a plan view of another modified resilient disc structure.
Figure 8:
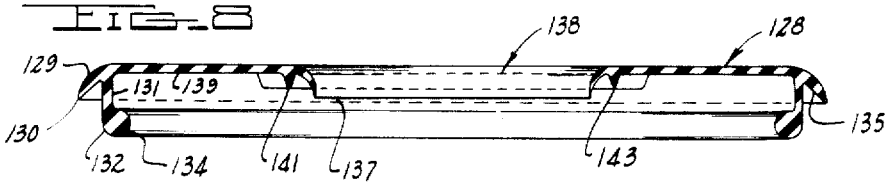
FIGURE 8 is a cross-section taken generally through the center of the disc shown in FIGURE 7.

FIGURES 7 and 8 of the drawings show a modified form of the present invention, having characteristics which cannot be obtained in the previously described structure. While the seal between the vent pipe and resilient disc has been satisfactory, it was felt that an improvement could be made. The periphery of the resilient disc 128 is generally the same as previously described. The thickened peripheral portion 129 thereof is of generally semicircular cross-section and terminates at edge 130. The underside 135 of the disc 128 engages the upper surface of the conical embossure (not shown). As in the first instance, and extending at generally right angles to the flat underside 139 of the resilient disc 128 is another flange 131. The lower section 132 thereof has a bulb portion 134 thereon, which is adapted to be positioned in pre-determined relationship within the pocket of the flange body (not shown). It is now apparent that the outer portion of the resilient disc 128 is substantially the same as the configuration of the previously described structure.

However, when we observe the central opening 138 of the disc 128, we note a change. The circumference 137 of the disc has a feathered edge, while being turned downwardly. It will also be noted that the undersurface 139 of the resilient flange 128 has integral therewith, a wedge shaped section 141 depending downwardly therefrom. The wedge shaped section is described about the circumference of the opening 138 in the form of a serpentine 142 (FIGURE 7). Therefore, when the resilient disc 128 is caused to be installed on a vent pipe, a double seal joint is formed.

The feathered edge 137 forms a seal on the upper edge thereof of the vent pipe, while the wedge shaped portion 140 is caused to engage the body of the pipe in much the same manner already described. However, because of the fact that the body of the resilient disc 128 is caused to be stretched a greater amount than the wedge portion 141, due to its greater length about the same circumference, the wedge shaped portion remains much softer than the body of the disc. This permits the radial end 143 of the wedge shaped portion to better engage the irregularities of the surface of the vent pipe to form the second seal thereabout.

Figure 9:
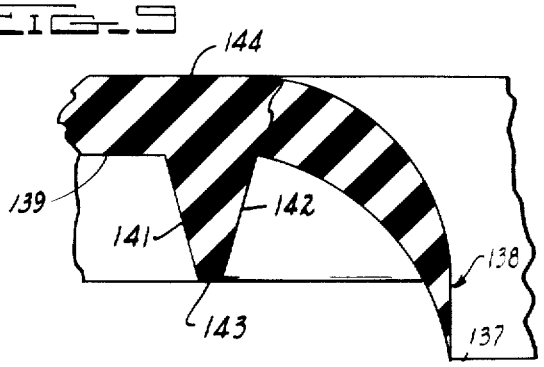
FIGURE 9 illustrates the configuration of the central opening through the resilient disc shown in FIGURE 8.

The partial view shown in FIGURE 9 illustrates substantially the true cross-section of the edge of the central opening, enlarged for clarity. It will be noted that in the modification shown in FIGURES 7–9 that the upper surface 144 of the resilient disc 128 is generally flat.

Figure 10:
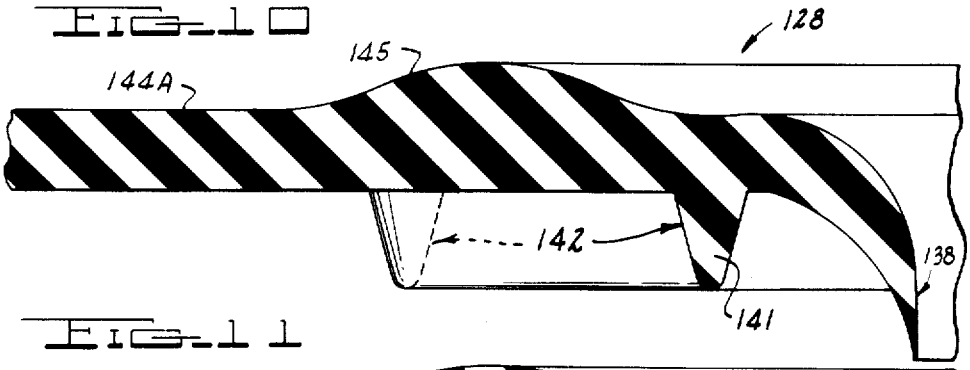
FIGURES 10 and 11 illustrate two additional modified configurations of the central opening through the resilient disc shown in FIGURE 8.

The modified form of the central opening 138 as shown in FIGURE 10 is generally the same as that shown in FIGURE 9, however, the upper surface 144A of the disc body has a thickened portion 145 disposed generally above the serpentine configuration 142. Therefore, as the resilient disc 128 is caused to engage a vent pipe (not shown) a greater force will be exerted on the body of the vent pipe and the softer portion 142 of the wedge shaped serpentine 141 will more firmly engage the irregular surface of the vent pipe.

Figure 11:
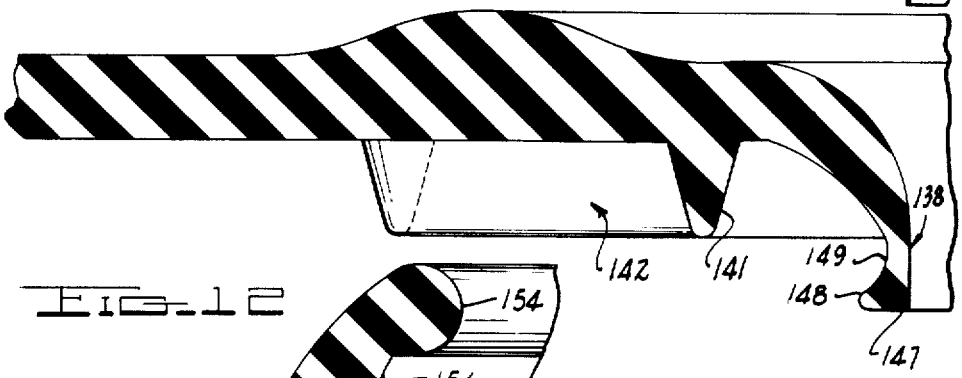

Another modified form of the present invention is shown in FIGURE 11 of the drawings. This modification is very similar to that shown in FIGURE 10, except that an enlarged section 148 is provided on the lower surface 147 of the opening 138, thereby eliminating the thin feathered edge. With this construction, the enlarged section 148 will engage the vent pipe, while the thin section 149 immediately therebehind which is of less strength will permit rolling of the joint, thereby in effect forming an angular relationship between surface 147 and the vent pipe.

The last modified form of the invention is shown in FIGURE 12. In this construction, the central portion 150 of the disc 128 is formed in the shape of a cylinder 152. The cylinder 152 has an enlarged bulb on the end thereof identified by the numeral 154, with a section 156 of reduced dimension immediately therebehind. The serpentine configuration 158 is formed on the inside diameter thereof, while the outer surface thereof is enlarged as shown at 159. This structure operates in the same manner as does the previously described structures, however, a longer joint seal is obtained thereby.

Having thus described my invention, I claim:

1. In a roof collar construction for use with a vent pipe which extends angularly through the roof of a building, the combination of, a substantially flat, rectangular body member; an upwardly extending conical embossure struck from the central area of said flat body member; an opening in said conical embossure; a downwardly depending flange portion formed on the inside diameter of said opening terminating in an upwardly formed, generally S-shaped lip, below the upper plane surface of said conical embossure, to form a pocket, the upper plane surface thereof terminating in angular relationship to the plane of said flat body member; an annular [flat] disc of thin resilient material; a downwardly depending flange portion integral with said disc and intermediate the inner and outer boundaries of said disc; an enlarged end on said portion, said end received and locked in said pocket; an opening in the central area of said thin disc, said opening having a tapered edge portion which is resiliently yieldable and of somewhat lesser diameter than the vent pipe; distortion of said opening during installation causing said tapered edge portion of said thin disc to elliptically engage the vent pipe to form a watershedding joint therebetween, the periphery of said disc extending downwardly into sealing engagement with the external surface of said conical embossure, while [the body of] said flat [flange] *body member* engages the roof proper.

2. In a roof collar construction for use with a vent pipe which extends angularly through the roof of a building, the combination of, a substantially flat, rectangular body member; an upwardly extending conical embossure struck from the central area of said flat body member; a round opening in said embossure; a downwardly depending flange portion formed on the inside diameter of said round opening and terminating in an upwardly formed generally S-shaped lip located on the upper plane surface of said conical embossure, so as to form a pocket; the upper plane surface of said embossure terminating in angular relationship to the plane of said flat body member; an annular disc of resilient material; an opening in the central area of said annular disc, said opening of less diameter than that of the vent pipe; a downwardly depending flange portion integral with said resilient disc intermediate the inner and outer boundaries thereof; an enlarged bulb portion integral with said downwardly depending flange portion, said bulb received and locked in said pocket; a wedge shaped member integral with the underside of said resilient disc formed into a serpentine configuration and spaced from the inner diameter of said disc; elastic distortion of the central opening in said resilient disc during installation of said assembly forming a first watershedding joint between the resilient disc and the vent pipe, and a second seal between the vent pipe and the serpentine configuration on the underside of said disc, the periphery of said disc extending downward into sealing engagement with the external surface of said conical embossure, while the body of said flat flange engages the roof proper.

3. A device as in claim 2, wherein the circumference of the central opening of the resilient disc has a feathered edge thereon.

4. A device as in claim 2, wherein the circumference of the central opening of the resilient disc has a feathered edge thereon which is turned downwardly and terminates below the lower edge of the wedge shaped section, prior to installation on a vent pipe.

5. A device as in claim 2, wherein the circumference of the central opening has an enlarged portion thereon.

6. A device as in claim 2, wherein the central opening in the disc is cylindrical in configuration and extends upwardly therefrom.

7. A device as in claim 3, wherein a thickened portion is provided adjacent the serpentine configuration to better engage the wedge shaped portion with the irregularities of the surface of the vent pipe.

8. A device as in claim 2, wherein the serpentine configuration is uniformly spaced from the edge of the central opening in said resilient disc.

9. In a roof collar construction for use with a vent pipe which extends angularly through the roof of a building, the combination of, a substantially flat, rectangular body member; an upwardly extending conical embossure struck from the central areas thereof; an opening in said embossure; a downwardly depending flange portion formed on the inside diameter of said opening and terminating in an upwardly formed generally S-shaped lip on the upper plane surface of said conical embossure, so as to form a pocket; the upper plane surface of said embossure terminating in angular relationship to the plane of said flat body member; an annular disc of resilient material; a cylindrical sleeve portion extending upwardly from the central area of said disc; a wedge shaped portion integral with said cylindrical sleeve and on the inside diameter thereof; said wedge shaped portion defining a serpentine configuration of uniform dimension and spaced from the end of said cylinder; the inside diameter of the cylindrical portion of less dimension than that of the vent pipe; a downwardly depending flange integral with the peripheral portion of said disc and intermediate the inner and outer boundaries thereof; an enlarged bulb portion integral with said downwardly depending flange and received and locked in said pocket; distortion of said cylindrical sleeve during installation forming a double watershedding joint between the vent pipe and sleeve, while the periphery of said disc extends downward into sealing engagement with the external surface of said conical embossure and the flat flange of the body engages the roof proper.

10. A device as in claim 9, wherein the upper edge of the cylindrical sleeve portion has a feathered edge.

11. A device as in claim 9, wherein the upper edge of the cylindrical sleeve portion has an enlarged portion thereon.

12. A device as in claim 9, wherein the upper edge of the cylindrical sleeve portion is of less dimension than the inside diameter of the sleeve proper.

13. A device as in claim 9, wherein the cylindrical sleeve portion has a thickened section adjacent to the serpentine configuration on the inside diameter thereof.

14. In a roof collar construction for use with a vent pipe which extends angularly through the roof of a building, the combination of, a substantially flat, rectangular body member; an opening in the central area of said substantially flat body member; a downwardly depending flange portion formed on the inside edge of said opening and terminating in an upwardly formed, generally S-shaped lip, to form a pocket; an annular [flat] disc of thin resilient material; a downwardly depending flange portion integral with said disc and located intermediate the inner and outer boundaries thereof; an enlarged end on said flange portion, said enlarged end received and locked in said pocket; an opening in the central area of said thin disc of somewhat lesser dimension than the outside diameter of the vent pipe; distortion of said opening during installation of said assembly on a vent pipe causing the central portion of said resilient disc to elliptically engage the vent pipe, thereby forming a watershedding joint therebetween, the outer periphery of said disc being in sealing engagement with the external upper surface of said substantially flat body member, while the underside of said flat body member engages the roof proper.

References Cited by the Examiner

The following references, cited by the Examiner, are of record in the patented file of this patent or the original patent.

UNITED STATES PATENTS

| | | | |
|---|---|---|---|
| 580,515 | 4/1897 | Weeden. | |
| 690,350 | 12/1901 | Bolger. | |
| 1,258,884 | 3/1918 | Fife | 285—44 X |
| 1,287,235 | 12/1918 | Cole | 285—44 |
| 1,317,446 | 9/1919 | Hollaender | 285—44 |
| 1,317,574 | 9/1919 | Grosvold | 285—44 |
| 1,686,881 | 10/1928 | Stephenson | 285—43 |
| 1,819,007 | 8/1931 | Smith | 285—110 |
| 1,844,870 | 2/1932 | Helling | 285—43 |
| 2,309,786 | 2/1943 | Porter | 285—189 X |
| 2,413,377 | 12/1946 | Putnam | 50—45 X |
| 2,510,926 | 6/1950 | Goldstein. | |
| 2,797,955 | 7/1957 | Wilfert. | |
| 2,904,354 | 9/1959 | Kifer | 285—43 |
| 2,985,465 | 5/1961 | Church | 285—43 X |

FOREIGN PATENTS

| | | |
|---|---|---|
| 511,895 | 6/1952 | Belgium. |

CARL W. TOMLIN, *Primary Examiner.*

T. F. CALLAGHAN, *Assistant Examiner.*